US010929530B1

(12) United States Patent
Puche Rondon et al.

(10) Patent No.: US 10,929,530 B1
(45) Date of Patent: Feb. 23, 2021

(54) SYSTEMS AND METHODS FOR MONITORING ACTIVITY IN AN HDMI NETWORK

(71) Applicants: Luis C. Puche Rondon, Miami, FL (US); Leonardo Babun, Miami, FL (US); Kemal Akkaya, Miami, FL (US); A. Selcuk Uluagac, Miami, FL (US)

(72) Inventors: Luis C. Puche Rondon, Miami, FL (US); Leonardo Babun, Miami, FL (US); Kemal Akkaya, Miami, FL (US); A. Selcuk Uluagac, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 16/939,397

(22) Filed: Jul. 27, 2020

(51) Int. Cl.
*G06F 21/55* (2013.01)
*G06N 20/00* (2019.01)
*G06F 13/42* (2006.01)

(52) U.S. Cl.
CPC .......... *G06F 21/552* (2013.01); *G06F 13/42* (2013.01); *G06N 20/00* (2019.01); *G06F 2221/034* (2013.01)

(58) Field of Classification Search
USPC ........................................................ 726/23
See application file for complete search history.

(56) References Cited

U.S. PATENT DOCUMENTS

| 2008/0134237 A1* | 6/2008 | Tu ....................... H04N 21/4532 725/38 |
| 2015/0379268 A1* | 12/2015 | Singh .................... G06F 21/554 726/23 |
| 2017/0034190 A1* | 2/2017 | May ..................... H04L 63/1408 |
| 2017/0064412 A1* | 3/2017 | Taxier ................ H04N 21/4882 |
| 2017/0116138 A1* | 4/2017 | Yang ..................... H04L 67/025 |
| 2017/0288894 A1* | 10/2017 | Marino ............... H04L 12/2809 |
| 2018/0012137 A1* | 1/2018 | Wright .................. G06N 7/005 |

(Continued)

OTHER PUBLICATIONS

Hu et al., "Identifying Malicious Web Domains Using Machine Learning Techniques with Online Credibility and Performance Data", 2016 IEEE Congress on Evolutionary Computation (CEC), pp. 5186-5194 (Year: 2016).*

(Continued)

*Primary Examiner* — Khalil Naghdali
(74) *Attorney, Agent, or Firm* — Saliwanchik, Lloyd & Eisenschenk

(57) ABSTRACT

Systems and methods for monitoring activity within High Definition Multimedia Interface (HDMI) enabled consumer electronics control (CEC) devices and their networks and identifying unexpected and/or suspicious activity within the network are provided. CEC message packets and packet attribute analysis can be used to identify unexpected and/or suspicious CEC activity within two or more interconnected HDMI devices. Three fundamental steps can be used: a data collection step can capture CEC activity occurring within an HDMI distribution; a data processing step can correlate data into a packet analysis process to create a model later used for evaluation; and a decision process step can use the model created in the data processing step to determine if activity occurring within the HDMI distribution is expected or unexpected.

16 Claims, 9 Drawing Sheets

(56) References Cited

U.S. PATENT DOCUMENTS

2018/0253492 A1* 9/2018 Maggio .................. G06F 16/71
2020/0327225 A1* 10/2020 Nguyen .................. G06N 3/08

OTHER PUBLICATIONS

Sacramento et al., "FlowHacker: Detecting Unknown Network Attacks in Big Traffic Data using Network Flows", 2018 17th IEEE International Conference On Trust, Security And Privacy In Computing And Communications/ 12th IEEE International Conference On Big Data Science And Engineering, pp. 567-572 (Year: 2018).*

* cited by examiner

FIG. 6

```
Disruption Mode Active: True
Welcome to Listener-mode, enter:
  q - quit, d - disrupt mode
Listener Mode (Q to exit):
Logger: >> bf:04:00:00:00
Power on detected! Sending shutoff command!     ↓ Display Reporting Power Change
Sent 36                                          ↓ Attacker Shutdown Command
[command received] 84:00:00:00
Logger: >> 8f:87:1f:00:00
Power on detected! Sending shutoff command!     ↓ Display Reporting Power Change
Sent 36                                          ↓ Attacker Shutdown Command
[command received] 87:1f:00:00
Logger: >> 8f:80:00:40:00
Power on detected! Sending shutoff command!     ↓ Display Reporting Power Change
Sent 36                                          ↓ Attacker Shutdown Command
[command received] 80:00:00:40:00
Logger: >> 02:46
[command received] 46
Logger: >> 02:03
[command received] 03
Logger: >> 1f:04:00:00:01
Power on detected! Sending shutoff command!     ↓ Display Reporting Power Change
Sent 36                                          ↓ Attacker Shutdown Command
[command received] 84:00:00:01
Logger: >> 1f:87:00:00:00
Power on detected! Sending shutoff command!     ↓ Display Reporting Power Change
Sent 36                                          ↓ Attacker Shutdown Command
[command received] 87:00:00:00
Logger: >> 02:8c
[command received] 8c
Logger: >> 02:46
```

FIG. 7

SYSTEMS AND METHODS FOR MONITORING ACTIVITY IN AN HDMI NETWORK

GOVERNMENT SUPPORT

This invention was made with government support under NSF-1663051 awarded by National Science Foundation. The government has certain rights in the invention.

BACKGROUND

Audio/video (A/V) devices have always witnessed a wide range of adoption as consumer electronics. High Definition Multimedia Interface (HDMI) is used primarily for the distribution of A/V signals and has become the de-facto standard for this purpose. For instance, in many applications such as concert halls or sporting events, large displays are chained together via HDMI to show concert images and gameplay. Indeed, close to 10 billion HDMI devices have been distributed worldwide, making HDMI one of the most highly deployed systems. With the requirement to merge control and communication over a single connection, the HDMI Consumer Electronics Control (CEC) protocol was specified with the release of the HDMI v1.2a. CEC provides control and communication between HDMI devices through HDMI cabling. This has led many vendors to implement CEC features on their devices under different trade names, including: Anynet+(Samsung), Aquos Link (Sharp), BRAVIA Link/Sync (Sony), CEC (Hitachi), CE-Link and Regza Link (Toshiba), SimpLink (LG), VIERA Link (Panasonic), EasyLink (Philips), and Realink (Mitsubishi). The adoption of CEC has become a means of control for well-known household devices (e.g., Google Chromecast, Apple TV, Sony A/V receivers, and televisions). This rapid adoption has made CEC into a ubiquitous protocol in many A/V installations, with many CEC enabled devices present in conference rooms, homes, offices, government facilities, and other secure facilities. Given the popularity and the penetration of HDMI-based devices, their security is of utmost importance.

Nonetheless, CEC is outside the reach of the traditional networking mechanisms, and most importantly, current security mechanisms provide no protection from CEC-based threats. This creates a widely-available, unprotected, and unexplored threat vector in locations (e.g., homes, government, offices, etc.) without mainstream user awareness. Unprotected HDMI networks give malicious entities an attractive medium of attack from which they can remain undetected, and CEC allows such entities to perform activities over an HDMI device distribution network such as information gathering, device control, and attack facilitation. In effect, an attacker can retrieve and alter the power state of all HDMI-capable devices without physical or traditional network access.

BRIEF SUMMARY

Embodiments of the subject invention provide novel and advantageous systems and methods for monitoring activity within a high definition multimedia interface (HDMI) consumer electronics control (CEC) network and identifying unexpected and/or suspicious activity within the network. CEC message packets and packet attribute analysis can be used to identify unexpected and/or suspicious CEC activity within two or more (e.g., several) interconnected HDMI devices. The systems and methods can use three fundamental steps: a data collection step can capture CEC activity occurring within an HDMI distribution; a data processing step can correlate data (received in the data collection step) into a packet analysis process (e.g., using machine learning) to create a model later used for evaluation; and a decision process step can use the model created in the data processing step to determine if activity occurring within the HDMI distribution is expected (e.g., normal) or unexpected (e.g., suspicious or malicious).

In an embodiment, a system for monitoring activity within an HDMI CEC network can comprise: a processor; and a machine-readable medium in operable communication with the processor and the HDMI CEC network and having instructions stored thereon that, when executed by the processor, perform the following steps: collecting, from first devices of the HDMI CEC network, first data comprising first features about the first devices; analyzing the first data using a machine learning model to compare the first features to second features known to be from benign devices; and determining whether any malicious activity is occurring within the HDMI CEC network based on the analyzing of the first data, to produce a decision on whether any malicious activity is occurring within the HDMI CEC network. The instructions, when executed, can further perform the following step: providing, to a display in operable communication with the machine-readable medium, the decision on whether any malicious activity is occurring within the HDMI CEC network. The instructions when executed can further perform the following steps prior to the collecting of the first data: collecting, from second devices of a known benign HDMI CEC network, second data comprising second features about the second devices; and processing the second data using machine learning based on the second features to create the machine learning model. The machine learning model can be, for example, a Markov Chain model. The collecting of the first data can comprise passively collecting the first data and/or the collecting of the second data can comprise passively collecting the second data. The first features can comprise CEC command type, and the second features can comprise CEC command type. Alternatively, the first data can comprise, or be supported by, packet attribute data of the first devices; the first data features can comprise packet length, packet source, packet destination, and/or any other CEC attributes; the second data can comprise packet attribute data of the second devices; and the second data features can comprise packet length, packet source, and packet destination.

In another embodiment, a method for monitoring activity within an HDMI CEC network can comprise: collecting, by a processor in operable communication with the HDMI CEC network, first data from first devices of the HDMI CEC network, the first data comprising first features about the first devices; analyzing, by the processor, the first data using a machine learning model to compare the first features to second features known to be from benign devices; and determining, by the processor, whether any malicious activity is occurring within the HDMI CEC network based on the analyzing of the first data, to produce a decision on whether any malicious activity is occurring within the HDMI CEC network. The method can further comprise providing, to a display in operable communication with the processor, the decision on whether any malicious activity is occurring within the HDMI CEC network. The method can further comprise, prior to the collecting of the first data: collecting, from second devices of a known benign HDMI CEC network, second data comprising second features about the second devices; and processing the second data using machine learning based on the second features to create the machine learning model. The machine learning model can be, for example, a Markov Chain model. The collecting of the first data can comprise passively collecting the first data and/or the collecting of the second data can comprise passively collecting the second data. The first features can comprise CEC command type, and the second features can comprise CEC command type. Alternatively, the first data can comprise packet attribute data of the first devices; the first data features can comprise packet length, packet source, and packet destination; the second data can comprise packet attribute data of the second devices; and the second data features can comprise packet length, packet source, and packet destination.

BRIEF DESCRIPTION OF DRAWINGS

FIG. 6 shows an attack of running handshake capture with aircrack-ng.

FIG. 7 shows an attack of television (TV) power state change and execution of targeted attack.

DETAILED DESCRIPTION

Embodiments of the subject invention provide novel and advantageous systems and methods for monitoring activity within a High Definition Multimedia Interface (HDMI) consumer electronics control (CEC) network and identifying unexpected and/or suspicious activity within the network. CEC message packets and packet attribute analysis can be used to identify unexpected and/or suspicious CEC activity within two or more (e.g., several) interconnected HDMI devices. The systems and methods can use three fundamental steps: a data collection step can capture CEC activity occurring within an HDMI distribution; a data processing step can correlate data (received in the data collection step) into a packet analysis process (e.g., using machine learning) to create a model later used for evaluation; and a decision process step can use the model created in the data processing step to determine if activity occurring within the HDMI distribution is expected (e.g., normal) or unexpected (e.g., suspicious or malicious).

As used herein, an HDMI distribution refers to a collection of connected HDMI devices with a shared CEC network connection. As used herein, a CEC-enabled device is any device that addresses, communicates, or otherwise performs any action over the CEC protocol. Devices and distributions such as these may be part of home theater systems, conference rooms, distributed audio-visual (A/V) applications, or other similar applications.

Figure 1:
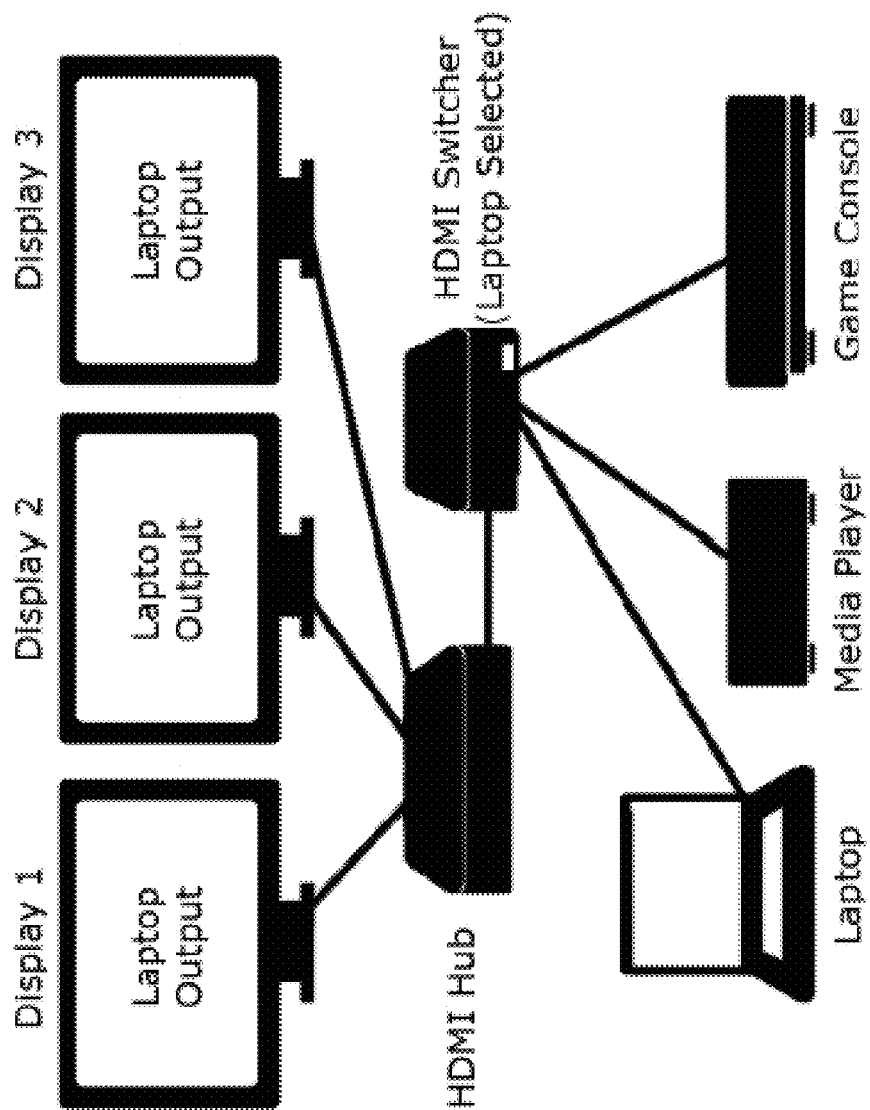
FIG. 1 is a schematic view of an example High Definition Multimedia Interface (HDMI) device distribution network, including three displays sharing the same source image (a laptop. Typically, in bars and conference rooms, displays are chained via HDMI cables.

While there has been abundant research on the security of traditional networks, CEC protocol has remained an under-researched communication component in the realm of cybersecurity. HDMI was developed with the purpose of digital A/V transfer with seamless integration of communication features through the same connection. Through the 19-pin connector, HDMI transfers audio, video, network, and CEC communication signals. With almost ten billion HDMI-capable devices distributed around the globe, HDMI has found a place in countless residences, offices, and secure facilities and has become one of the most widely-deployed protocols worldwide. In its current form, HDMI is primarily used in high-bandwidth, video distribution applications between vastly different types of devices (e.g., televisions, Blu-ray players, media centers, etc.). HDMI deployments are not limited to one-to-one connections. Similar to Ethernet networks, there are many devices that control the HDMI signal flow and distribute signal in a controlled and organized manner. For instance, referring to FIG. 1, the user maintains the same visual image over three displays and switches between three source devices. FIG. 1 also shows the laptop selected as the active source over multiple displays. Depending on the device setup, there is a distribution of CEC through the same connection. The following components can be included in an HDMI distribution: a display, which is any device with a primary purpose of being an end-display such as a television or a projector; a hub/splitter, which is any device that primarily allows multiple video signals to be split to various displays from a single video input without switching; a switch, which is any device with a primary purpose of allowing various source device inputs to one or more display device outputs (a switch also performs switching between these sources to a different output(s)); and source device, which is any device that is primarily an HDMI output-only device such as a Chromecast or a laptop.

Figure 2:
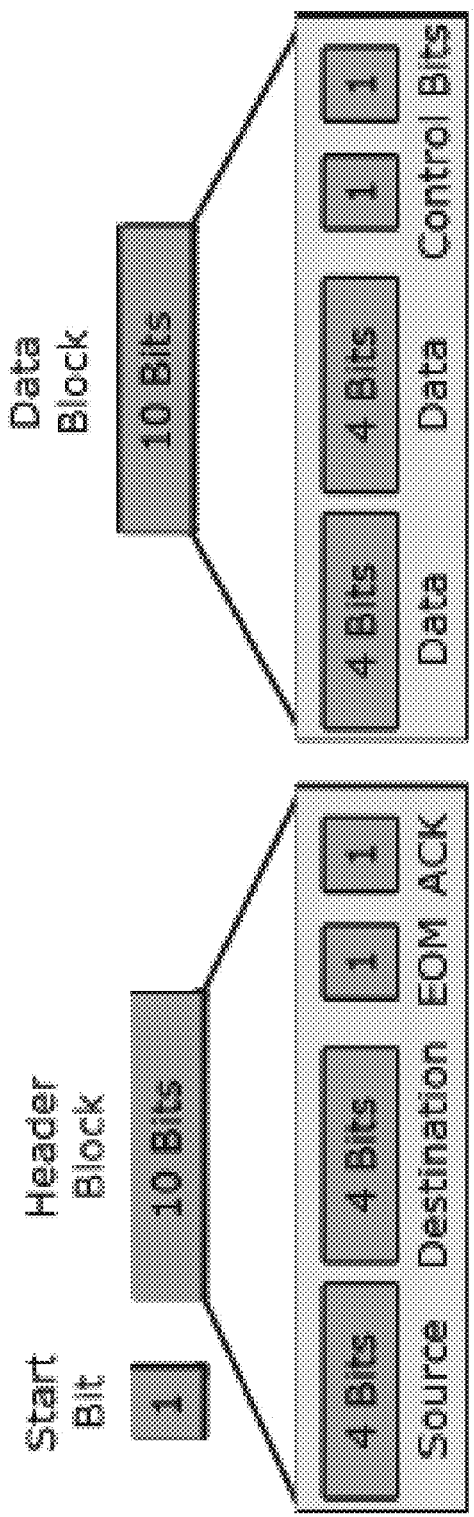
FIG. 2 is a schematic view of a consumer electronics control (CEC) stack and structure as used in HDMI.

CEC was developed to enable interoperability between HDMI devices, with full specification in 2005. CEC signals are carried through Pin 13 as part of the HDMI interface. The communications in CEC are divided into 10-bit blocks that include a header, opcode, and data blocks. The flow of information is dictated by the header, and the first eight bits note the source and destination. Message destination may refer to a specific device by logical address or broadcast as noted in Table 1. This broadcast functionality is especially exploited by HDMI-Walk attacks. FIG. 2 shows how the CEC header allows for 16 unique IDs (4 bits). IDs 0-E specify device addresses while the last logical address (F) is reserved for broadcast within the HDMI distribution. This logical address assignment usually follows certain device-type guidelines. For example, displays are usually assigned to the logical address (0) and additional displays self-assign to "free use" (E) as shown in Table 1.

One of the largest challenges with securing CEC revolves around purpose, implementation, and proliferation. CEC, being an established means of communication for A/V devices, has been widely deployed in its current form in billions of devices by different vendors. An endeavor to update the protocol with security mechanisms, or present a new version of the protocol, has to consider discontinued devices, vendor-specific implementations, and backwards compatibility or face loss of functionality. Existing devices may not have the hardware or connectivity capabilities to upgrade. All of these factors make traditional security mechanisms too expensive or impractical to deploy. Access to all CEC features can be disabled through the complete removal of CEC Pin 13 in the connection. CEC-less adapters/cables that partially or completely prevent the CEC propagation within distribution may accomplish this goal. Disabling CEC control may help mitigate DoS and any attack dependent on device control. However, it will not help against topology inference from devices that still provide their information after CEC control is disabled. Some devices will still report address and CEC details on request even if CEC control functionality is disabled.

TABLE 1

CEC Logical Address Assignment. [16]

| Logical Address | Device Type |
| --- | --- |
| 0 | Television |
| 1, 2 | Recording Devices |
| 3, 6, 7, A | Tuners |
| 4, 8, 9, B | Playback Devices |
| C, D | Reserved |
| E | Free Use |
| F | Broadcast |

Knowing how devices operate, how they propagate, and strategic placement of CEC-less adapters/cabling may limit unauthorized access to CEC and prevent CEC-based attacks. Awareness serves as a middle ground between fully removing CEC and completely allowing communication. For example, a guest presenter should not have control to the distribution beyond displaying his/her laptop, so there is no need for the presentation podium to allow CEC communication.

Preventing an unauthorized device from joining an HDMI distribution is a good option in complete HDMI-Based attack mitigation. For example, an intrusion detection system (IDS) for CEC can be used as a preventive measure for CEC based attacks, moving from manual device scanning to more automated approaches. Machine learning-based approaches that consider the state of different features in hardware distribution is one possibility.

Unlike related art methods and systems, embodiments of the subject invention provide security from CEC protocol attacks in an HDMI distribution (see also, e.g.; (Davis, What the HEC? Security implications of HDMI Ethernet Channel and other related protocols, https://www.nccgroup.trust/globalassets/our-research/uk/whitepapers/2013/44con_hdmi_ethernet_channel_andy\_davis_ncc_group_wp.pdf, August 2013; Davis, HDMI: Hacking Displays Made Interesting, https://media.blackhat.com/bh-eu-12/Davis/bh-eu-12-Davis-HDMI-Slides.pdf, March 2012; Niemietz et al., Not so Smart: On Smart TV Apps. In 2015 International Workshop on Secure Internet of Things (SIoT), 72-81, https://doi.org/10.1109/SIOT.2015.13, 2015; Oren et al., From the Aether to the Ethernet-Attacking the Internet using Broadcast Digital Television, In 23rd USENIX Security Symposium (USENIX Security 14), USENIX Association, San Diego, Calif., 353-368, https://www.usenix.org/conference/usenixsecurity14/technical-sessions/presentation/oren, 2014; Smith, High-Def Fuzzing: Exploring Vulnerabilities in HDMICEC, https://media.defcon.org/, November 2015; and Zhang et al., Understanding IoT Security Through the Data Crystal Ball: Where We Are Now and Where We Are Going to Be, CoRR abs/1703.09809 (2017), arXiv: 1703.09809 http://arxiv.org/abs/1703.09809; all of which are hereby incorporated by reference herein in their entireties). Embodiments introduce and examine a novel attack method called HDMI-Walk to HDMI devices. The scope is entirely through CEC as the main vector of attack and does not rely on any custom applications, software vulnerabilities, fuzzing, buffer-overflows, vendor-specific attacks, or traditional network connectivity. The exploitation of the CEC protocol in both local and remote attacks is focused on. Embodiments can secure against at least the following five types of attacks: malicious device scanning; eavesdropping; facilitation of attacks (e.g., Wi-Fi protected access (WPA) hand-shake theft); information theft; and denial of service (DoS) through HDMI.

Figure 9:
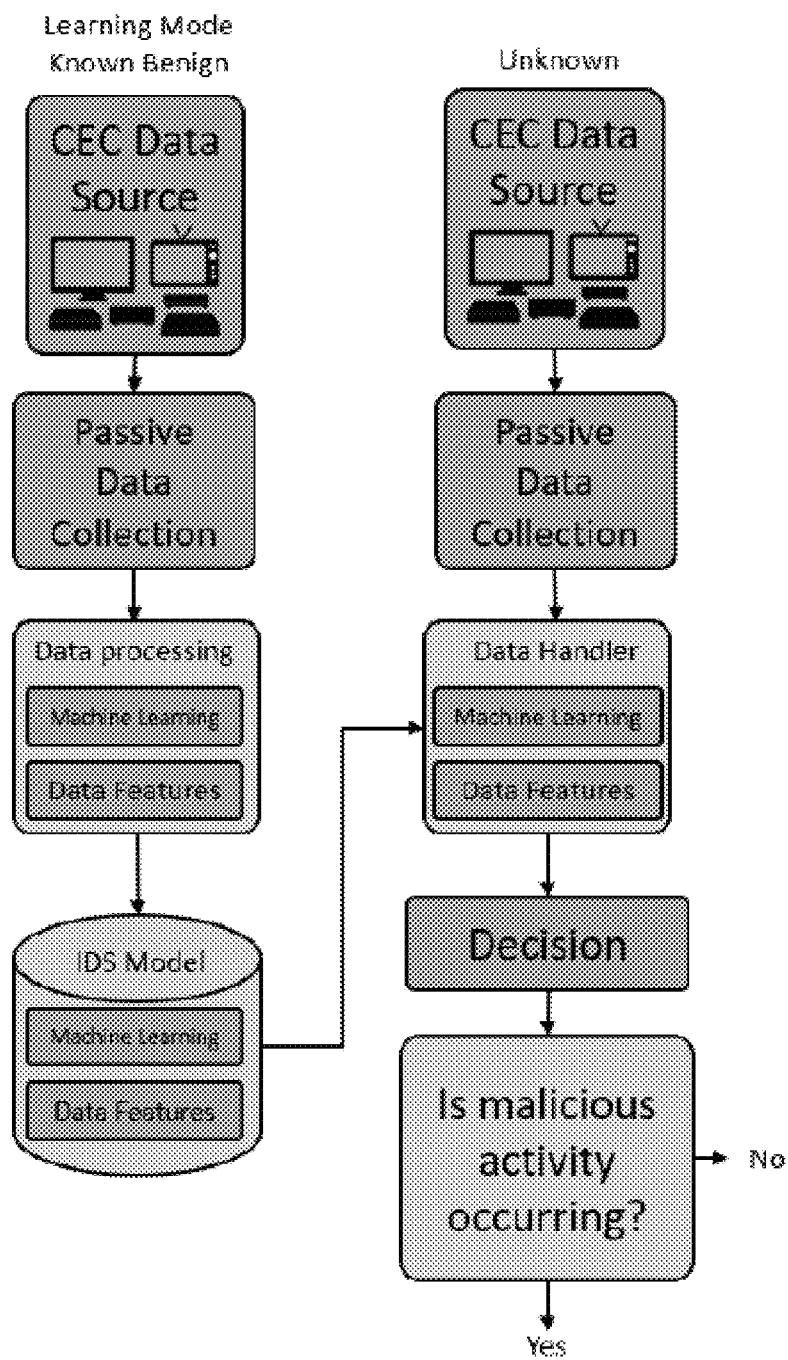
FIG. 9 is a schematic view of detection framework for CEC-based communication, according to an embodiment of the subject invention.

FIG. 9 is a schematic view of detection framework for CEC-based communication, according to an embodiment of the subject invention. Referring to the right-hand side of FIG. 9, the system/method can include passively collecting data from CEC data sources within an HDMI distribution, using a machine learning model to examine and/or analyze data features and compare them with data features known to be from benign sources, and making a decision about whether malicious activity is occurring within the HDMI distribution. Though not depicted, this decision can then be provided to a user (e.g., via a display or other way of providing data to the user). Referring to the left-hand side of FIG. 9, the system/method can further include a learning mode where the machine learning model is trained using known benign CEC data sources within an HDMI distribution. The learning mode can include passively collecting data from the known benign CEC data sources within the HDMI distribution, processing the data using machine learning based on data features of the data, and creating a machine learning model (e.g., an intrusion detection system (IDS) model) using machine learning based on the data features. This machine learning model can later be used in the decision of whether malicious activity is occurring within the HDMI distribution (as represented by the arrow between the left-hand and right-hand sides of FIG. 9).

Two detection approaches can be used to detect unexpected CEC activity: machine learning correlation; and expected packet attribute comparison. With machine learning correlation, the framework learns from an HDMI distribution (operating normally) and creates a machine learning model using CEC command type as the primary feature. With this expected activity model, unexpected command types can be detected, and the system/method can indicate unexpected CEC activity passing within an HDMI distribution. With the expected packet attribute comparison, the framework monitors and captures CEC communication messages within an HDMI distribution. It then compares received packets to an existing set, map, or correlation function of acceptable attributes (e.g., acceptable packet length, source, destination, etc.). This comparison then determines if the received CEC packets are expected from these attributes. The machine learning approach takes advantage of the deterministic nature of CEC communication to find unexpected command types and the possibility of CEC abuse within an HDMI distribution. The expected packet attribute comparison presents an additional layer of complexity for an attacker attempting to hide their activity using acceptable CEC command types. In many embodiments, both approaches can function together to provide a complete solution and detect any unexpected activity occurring within the HDMI/CEC distribution. Specifically, to make the decision algorithm stronger, the outcomes of both approaches can be combined, and any breaches of the rules thereof can be considered as violations. In a system that considers violations within a given timeframe, a user may also adjust the threshold of violations within a timeframe to minimize false positives. In order to minimize overhead or cause no overhead in standard operation, the system/method can operate as a separate device within an HDMI distribution, reading messages passively. Alternatively, the system/method can operate in one or many existing devices within an HDMI distribution, costing some overhead on the existing device(s).

With respect to activity type classification, further analysis can be applied on packets deemed violations by the initial detection mechanism. An application may be creating a signature of different types of malicious behaviors as presented by proposed attacks. These signatures can then be used to classify found violations in the detection stage. These signatures may be adjusted to known attacks and activities to aid in classification. Examples of such activities include "scanning", "power control abuse", "video switching abuse", and "unauthorized data transfer".

In order to properly quantify CEC communication into a machine learning model (e.g., a Markov Chain), the framework must consider all CEC command types. Due to vendor differences and an attacker's ability to create packets of any command type, embodiments should consider all the possible command types as states. In effect, this consideration yields a total of 256 (00-FF) states. For example, the CEC packet "02:89:01" is marked as command type "89" and data feature-length fetched of "8". A depiction of CEC data structure is shown in FIG. 2. Experimental results demonstrate an excellent detection rate for all cases of unexpected activity occurring within CEC in the HDMI distribution and a high success rate in correctly classifying this activity by specific behavior as noted above. The framework shows no additional overhead or delays in communication as it passively monitors the CEC network for CEC packets.

HDMI is the backbone and the de-facto standard for A/V interfacing between video-enabled devices. Currently, billions (or even tens of billions) of HDMI devices exist in the world and are widely used to distribute A/V signals. With CEC as part of the HDMI standard, embodiments of the subject invention improve the security of CEC communication and consequentially, HDMI devices. Embodiments of the subject invention are applicable in conference rooms, entertainment centers, concert halls, classrooms, and any location where HDMI devices are used.

Embodiments of the subject invention provide security, allowing for easy and reliable identification of unexpected activity occurring within an HDMI distribution. Compromised devices and/or the presence of a HDMI-based attacker within an HDMI distribution can be detected. Coupled with preconfigured signatures, the framework can also allow for the identification of specific CEC-based unauthorized activities.

Embodiments of the subject invention can detect new devices with active CEC communication added to an HDMI distribution. With this information, an administrator may be able to then query, fetch, and further identify new additions to an HDMI distribution. Upon finding unauthorized devices, an administrator can then be able to handle them appropriately (e.g., by removing an unauthorized device from a distribution).

With insider and outsider threats being one of the most significant security threats in real world applications, embodiments of the subject invention can act as a preventive measure for CEC-based attacks. If a device is inserted or an existing device is compromised, an administrator could be notified of an attack. This is specifically relevant in secure facilities with sensitive information where an insider or outsider may be anyone with access to an HDMI distribution such as a conference room.

No related art security mechanisms exist that are designed specifically for any part of HDMI distribution networks. As HDMI-based attacks are relatively new, there has been very little research on this topic in the related art. Specifically, there has been no related art design of any form of defense mechanism tailored towards the CEC protocol or HDMI distributions in general.

Embodiments of the subject invention provide complete passive monitoring and inherent functionality independent of any specific device, firmware, brand, or model. Because most manufacturers do not provide source code for their devices, embodiments can focus on active communication without the requirement for source code. Further, the framework can use one of the main properties of the CEC protocol to its advantage. The design of CEC over an HDMI distribution does not allow for partial propagation of CEC messages among connected devices. Messages sent over CEC are transmitted to all devices within the same distribution so a device can easily read all messages from any location within a distribution. This concept allows for effective passive detection as an attacker cannot selectively hide their messages from any listening device. This allows for passive monitoring of all ongoing communication without disruption or overhead to overall CEC network or HDMI function.

Implementation of security within the CEC protocol (without embodiments of the subject invention) would seem to require the cooperation of all vendors that implement CEC in their devices. This could mean firmware or hardware changes in billions of devices. This is both impractical and a costly undertaking due to the number of HDMI devices in the market. Another impractical solution would be completely removing CEC from existing devices through the use of CEC-less cables (that block communication of the CEC protocol). Disabling the CEC protocol on individual devices does not even prevent the propagation of CEC over connected HDMI devices. Embodiments of the subject invention resolve the issue with the inherently insecure design of the CEC protocol.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

Materials and Methods

An HDMI distribution network within a conference room that may be used for confidential presentations is considered. The topology of this distribution network includes common HDMI distribution equipment such as switches, hubs, and HDMI devices such as displays and sources. The attacker is an invited guest presenter referred to as "Mallory", who has a small amount of time to prepare in the conference room without any supervision. Mallory either compromises an existing HDMI device through malware, or hides a malicious HDMI-capable device within the distribution (e.g., connected behind a television). Mallory connects her own laptop to auxiliary ports on the podium prior and during the presentation and perpetrates the HDMI-Walk attacks. After presenting, Mallory leaves. Sometime after her departure, further security policies are enacted and unsupervised access to the conference room is disallowed to visitors. Mallory's only avenue of attack is to access her hidden device indirectly, locally, or remotely.

Compromising Devices: Mallory may compromise an HDMI distribution without direct access to the HDMI network. Malware (e.g., firmware, app-based) could compromise an existing device to Mallory's benefit, acting as a link between the distribution and their machine. For instance, privileged malware applications in an Android-based A/V device could make use of the HDMIControlManager and HDMIControlService functionality that is available to transmit and receive arbitrary messages.

Possible Payloads: CEC attacks can provide access to devices that may have been believed secure or isolated in a conference room. Conference rooms may serve varying purposes from unrestricted to confidential usage. When a space is in unrestricted usage, an attacker may disrupt operation, damage equipment, and prevent or inhibit normal usage of a conference room through CEC attacks. If the space is used for confidential purposes, an attacker may gather data about a system, gather restricted information within a conference room, or simply facilitate more complex attacks (e.g., wireless hand-shake theft, eavesdropping). In both of these cases, an attacker may avoid traditional means of detection through the use of CEC.

Attack Mode 1 (Local Communication): Mallory only has local access when connecting directly to the HDMI distribution network as a presenter. This case is independent of any form of network access, as it relies on Mallory's ability to connect to the auxiliary connection on the conference room podium. Local communication from her laptop can be done through the HDMI distribution with HDMI-Walk and to the hidden or compromised device.

Attack Mode 2 (Remote Communication): In this case, Mallory has found an open guest network connection during her first visit or later gained unauthorized internet access. This allows Mallory to enable remote access to her hidden device. Further, this allows Mallory to perform specific attacks.

In the examples, an "isolated device" is an HDMI device that has no network connectivity to traditional IP networks in any manner; a "limited access user" is primarily described as a user with temporary physical access to a location and limited internet protocol (IP) network connectivity, such as a temporary visitor (e.g., a presenter); an "attacker" is any limited access user that attempts malicious access to unauthorized resources. The attacker's motivations are to disrupt, gather information, gain unauthorized access, learn user behavior, and/or perpetrate the attacks listed in the threat model below. The attacker may be a temporary visitor with limited access to the facilities (e.g., a presenter such as Mallory).

CEC Propagation: Full CEC protocol propagation over the distribution of HDMI devices is assumed. Some devices tested had no function to disable CEC propagation, even if CEC control was disabled. In testing performed on devices with multiple HDMI ports, 80% of devices provided some form of propagation.

CEC Control: CEC control is assumed to be active on connected devices in the distribution. This is a realistic scenario, as CEC functionality was enabled by default in all CEC-capable devices tested. Also, many devices revert to default settings after a firmware update.

Access to HDMI Components: It is assumed that Mallory has access to some HDMI components (or endpoints) in the distribution. This is a realistic assumption as A/V components are often not as secure as networking components. Display inputs and outputs are often visible and available to presenters. Presenters are often given enough time to prepare and free access to A/V equipment in a conference room without supervision or suspicion. In some cases, displays (often used for information purposes) can be found outside conference rooms, and these could act as another connection point to an HDMI distribution inside a conference room.

HDMI-Walk Assumes the Following Five Threats as Part of the Threat Model.

Threat 1—Malicious CEC Scanning: This threat considers the malicious use of scanning features through CEC and exposed HDMI ports to gather information about the connected devices. For instance, Mallory can create a topology of available HDMI devices to control and use this information to perform further attacks.

Threat 2—Eavesdropping: In this threat, Mallory is not present but actively eavesdrops on CEC communication through an implanted device.

Threat 3—Facilitation of attacks: This threat eliminates time and physical access limitations in wired and wireless attacks. HDMI-Walk facilitates many of these attacks so that they become more viable or more difficult to detect. For example, Mallory installs a device to passively capture WPA handshakes, avoid detection, and control through CEC remotely.

Threat 4—Information Theft: This threat considers information theft as a form of data transfer that Mallory may find valuable. For example, information about available HDMI devices or wireless handshake capture that would enable future attacks can be stolen.

Threat 5—Denial of Service: This threat considers DoS attacks where Mallory disrupts the availability of a system through an HDMI connection. These attacks may be targeted to a specific device or broadcast to multiple devices. For example, Mallory can prevent the use of a television through the repeated broadcast of HDMI control commands.

Attacks that focus entirely on IP networks, data injection attacks through CEC such as buffer overflows over CEC, and setting manipulation attacks were not considered for the examples. Similarly, USB and Bluetooth protocols were not considered for the examples.

Figure 3:
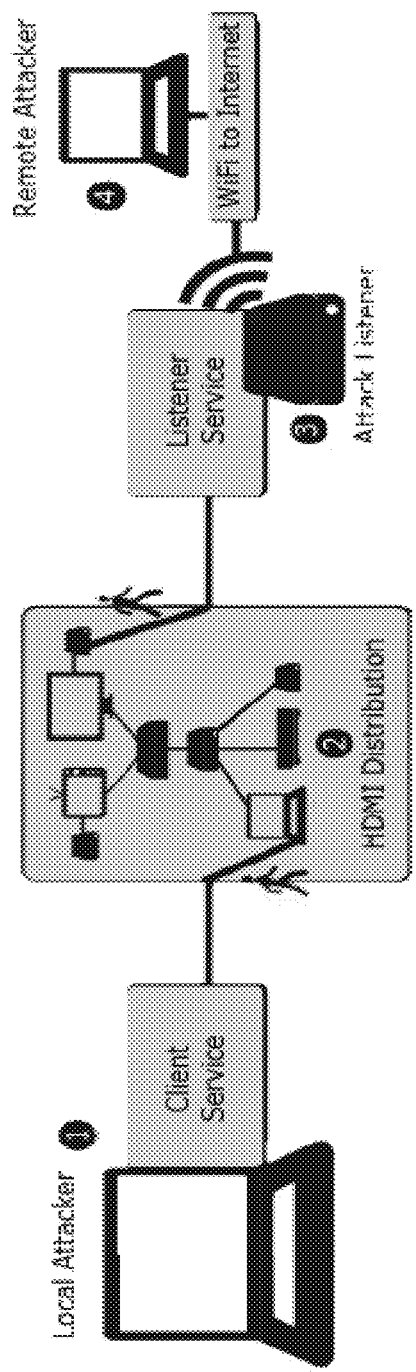
FIG. 3 is a schematic view of a general architecture used for HDMI-walk-based attacks.

FIG. 3 depicts the general architecture of HDMI-Walk, which comes with four main components: local attacker; HDMI Distribution; attack listener; and remote attacker. The first component of HDMI-Walk is the local attacker, which runs the client service in their local machine. This local hardware is temporarily connected to the HDMI distribution. The client service contains any required modules for communication to the listener and facilitates the attacks through HDMI-Walk (item 1 in FIG. 3). The second part is the HDMI Distribution, which is the core of the attacks and allows for end-to-end communication between devices through HDMI as a medium. The user may scan the distribution for addressed CEC devices, as well as communicate bi-directionally with other devices (item 2 in FIG. 3). The third part of the architecture involves the attack listener. The attack listener is the physical attacker device and hosts the listener service. The listener service includes all the required modules for HDMI-Walk communication and listener-run attacks. This service also includes a remote access module to enable communication to the remote client if a connection is available (item 3 in FIG. 3). The remote attacker communicates directly through a remote connection to the attack listener if remote access is possible (item 4 in FIG. 3).

Local Attacker: A local attacker establishes communication with the listener device through CEC and the HDMI Distribution. The local attacker places their client device in an exposed HDMI port such as an auxiliary connection in a presentation room or a side input of a television. For example, the client device can be a laptop with a CEC capable adapter. The client's main purpose is to establish communication with the listener and serves as the main interface for an attacker to issue commands and receive data from the listener device. The local client communicates to the listener through HDMI-Walk derived control of the distribution. Additionally, the client device hosts the client service. This service contains all necessary software modules for specific actions within the scope of CEC such as the ability for file transfer, arbitrary CEC communication, and CEC scanning.

HDMI Distribution: CEC protocol allows propagation and control. These are not inherently equal or mutually exclusive; for instance, a device may be able to both control and propagate CEC commands through auxiliary HDMI ports. In contrast, a different device, such as an HDMI hub, may allow propagation but offer no CEC-based control. The inherent design of CEC allows for any device to transmit and request information to and from any other device within the same distribution. CEC commands propagate from device to device, passing through different "hops" in a similar fashion to a bus network while allowing individual devices to further propagate communication to their own branched connections. This is a requirement in "scanning" behavior, which allows for any device to query others by logical address for a name, type, language, on-screen display (OSD) string, vendor, power status, CEC version, and source status. With this, the querying device is able to build a map of available CEC devices within the distribution. Because the headers signify a broadcast or a message to a specific device by logical address, this becomes useful for targeting specific devices or broadcasting to all devices.

Attacker Listener: The listener device awaits client commands. Ideally, the listener is hidden by the attacker in a location such as behind a television, in an equipment cabinet or anywhere there is a connection to the HDMI distribution. The listener may establish communication with CEC-enabled isolated devices through HDMI-Walk. In the attack model, once the listener receives expected commands from the attacker client (local or remote), it will enact actions in the HDMI distribution on behalf of the attacker. In HDMI-Walk, the attack listener performs the core actions for the attacks and runs all the separate modules required for each attack. Additionally, the listener hosts all the software modules required by the attacker for CEC communication, CEC file transfer, CEC scanning, microphone access, wireless access, and remote access.

Remote Attacker: The remote attacker maintains a remote web interface to a listener device. Commands and messages are relayed bi-directionally from the listener and the remote attacker. In contrast to the local attacker, the remote attacker operates in a remote web server, has no direct CEC connectivity, and only hosts remote communication modules. The remote attacker's server is polled via an internet connection by the listener for new commands. This allows the attacker to perform remote execution of CEC actions using the listener. These actions may involve CEC information gathering, targeted attacks, DoS, or any attack module within the listener device.

The purpose of the attacker is to leverage the HDMI-Walk capabilities to discover, manipulate, control, and cause undesired operation to devices within an HDMI distribution. The adversary also aims to use CEC as the primary medium for their attacks. This is achieved via a connection to the listener through a remote client or through a local HDMI connection. In all of the attacks, the attacker plants the listener device somewhere within the CEC distribution (e.g., behind a television).

TABLE 2

Hardware and software usage.

| Hardware | Software |
| --- | --- |
| Sharp Smart TV. | Pulse Eight LibCEC 4.0.2 |
| Samsung UN26EH4000F | Python 3.6.1 |
| Monoprice Blackbird 3x1 HDMI Switch | Aircrack-ng 1.2-rc4 |
| Wyrestorm - 1x4 HDMI 1.3b Splitter | Eclipse IDE |
| Chromecast NC2-6A5 | PyAudio v0.2.11 |
| Sony STR-ZA2100ES | Jersey JAX-RS |
| Raspberry 3 Model B x2 | Raspbian Version 9 |
| TP-Link TL-WN722N V1 Adapter | Swagger.io |
| Motorola G5 Plus Phone | Java 1.8 |
| TP-Link TL-WR841N Router | AWS Elastic Beanstalk |

Figure 4:
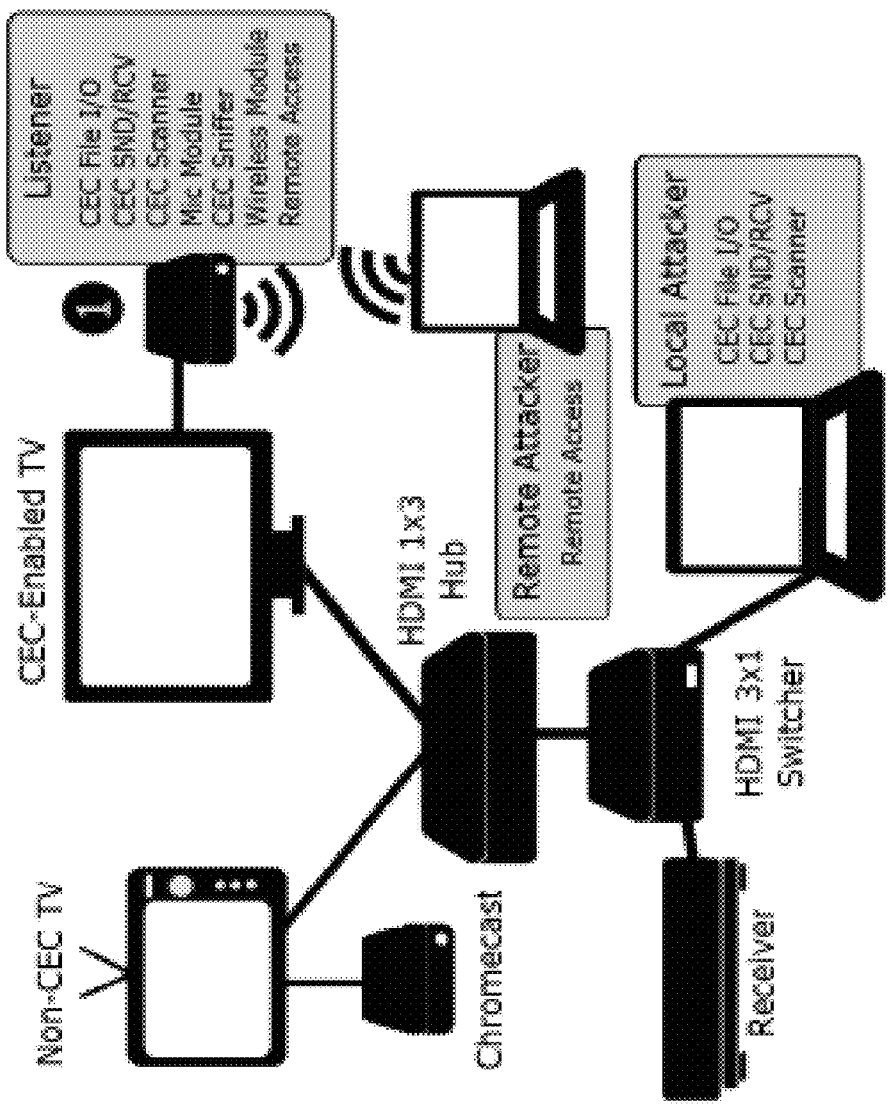
FIG. 4 is a schematic view of an HDMI-walk testbed implemented with various commodity HDMI devices.

In order to ensure the attacks were implemented in a realistic HDMI environment, a CEC capable testbed was created with standard and widely available commodity HDMI devices, as shown in Table 2. The setup included two displays, an HDMI switcher, an HDMI hub, a source, and the attacker devices as depicted in FIG. 4. LibCEC, an open-source CEC implementation, was utilized (see also Pulse-Eight, USB-CEC Adapter communication Library. https://github.com/Pulse-Eight/libcec/, 2018; which is hereby incorporated herein by reference in its entirety). This library provides Python modules that were used to create both the client and the listener services. Due to readily available CEC support in Raspberry Pi v3 devices, two Pis were used—one as the listener and one as the local client to perform the attacks and evaluations. To test WiFi (handshake) and remote attacks, a network with SSID Portabox was created. Even with a non-CEC-addressed TV, the TV simply propagates any CEC commands through additional ports.

The software modules used included CEC File I/O, CEC SND/RCV, CEC Scanner, Microphone Module, CEC Sniffer, Wireless Module, and Remote Access Module. These are discussed in detail below.

CEC File I/O: This module facilitates sensitive data transfer within the CEC protocol. HDMI-Walk was leveraged for data transfer between client and listener devices within the CEC distribution. This module can be subdivided into three sections: serialization; transmission; and deserialization. A file transfer from the listener (sender) to the attacker (receiver) is broken down as follows.

Serialization: LibCEC allows the transfer of CEC packets through the distribution. The attacker device (hosting client service) first begins the file request with the "aa:aa:aa:aa" packet. The data is then imported into the running service and converted into hexadecimal values. This serialized file is stored locally within the buffer of the current sender (i.e., the attack listener).

Transmission: The buffer is segmented into hexadecimal strings of length 28 in preparation for the file transfer by the sender. Each segment of the buffer is sent with the data header "xx:00" over CEC to the receiver. Once all segments are exhausted, the transmission ends with "ee:ee:ee:ee". Any packet received without these headers is dismissed by the receiving device.

Deserialization: Packets are received in order by the receiver (i.e., the attacker laptop), cropped, and then stored locally in a clean data buffer. With transmission finished, the client deserializes the stored buffer into the original file.

CEC SND/RCV: This module sends and receives custom CEC messages through the alteration of the header (destination) and data blocks. These may be used to activate listener conditions, attacks, or request a file transfer from the listener. Sending and receiving of custom CEC messages was achieved through the use of the libCEC Python module. This library provides the communication method that allows the creation and transmission of CEC commands within specifications. This function was used as part of File I/O transfer or to transmit specific commands to a device over the HDMI distribution.

CEC Scanner: This module scans a distribution to identify CEC devices. The CEC scanner implements the standard LibCEC scan command that queries all possible devices within a distribution and records all valid responses. HDMI-Walk captures the available devices and provides the attacker information on each device and the logical address of their listener.

TABLE 3

| | Module utilization per attack | | | | |
|---|---|---|---|---|---|
| | Topol. Infer. | CEC Eaves. | Handshk. Theft | Targeted Attack | Broadcast DoS |
| File I/O | ◐ | ◐ | ◐ | ○ | ○ |
| SDN/RCV | ● | ◐ | ◐ | ● | ● |
| Scanner | ● | ◐ | ◐ | ● | ◐ |
| Mic Mdl. | ○ | ◐ | ○ | ○ | ○ |
| CEC Sniffer | ○ | ○ | ○ | ● | ○ |

TABLE 3-continued

| | Module utilization per attack | | | | |
|---|---|---|---|---|---|
| | Topol. Infer. | CEC Eaves. | Handshk. Theft | Targeted Attack | Broadcast DoS |
| Wireless Mdl. | ○ | ○ | ◐ | ○ | ○ |
| Remote Mdl. | ● | ○ | ○ | ● | ● |

Legend: ◐ = Local Attack, ◐ = Remote Attack, ○ = Neither, ● = Both

Microphone Module: This module was used to record and store anything captured by the embedded microphone on the listener device for the purpose of audio eavesdropping. Microphone access and recording were achieved through the use of the PyAudio library. PyAudio allows local storage of audio data within a Python operation at pre-determined length and bandwidths. This module was created to activate the microphone in the listener device.

CEC Sniffer: CEC sniffer allows the listener to passively monitor all the commands and data passing through the CEC distribution. Targeted attacks may use this feature to trigger commands upon the action of a device. This was implemented through the command callback in the LibCEC library, which enabled handling of any command received through the bus. Every packet was analyzed for specific calls during the attack phases. With this form of detection, attacks may target specific devices based on their power state change.

Wireless Module: The wireless module comes in two parts. The first part provides standard wireless access or the capability to connect to an internet-enabled network for remote support to the attacker. The second part implements Aircracking to allow for sniffing, capture, and final cleaning of WPA/WPA2 handshakes for further cracking. A monitor mode capable adapter was used with this module (TP-Link), and Python calls were used to automate the process in the target WiFi network.

Remote Access Module: The remote access module was utilized to allow for remote requests to the listener device through a valid Internet connection. It is divided into two parts: Server Component; and the Listener Web Component.

Server Component: A RESTful application programming interface (API) running Swagger graphical user interface (GUI) as the remote client and server component within AWS' Elastic Beanstalk service was used. Two string caches reachable with the paths /cec/listener and /cec/webclient were created, each with GET and POST methods. The attacker accesses this server component and submits their commands through POST: /cec/listener with a JSON object containing the desired command to execute remotely. This server can be freely accessed through (L Puche Rondon, "Remote HDMI-Walk Client", http://phdapisenv.hzqhv6ugji.us-east-1.elasticbeanstalk.com/; which is hereby incorporated by reference herein in its entirety).

Listener Web Component: The web component was implemented using Python threading and polling requests to the server. The listener polled GET: /cec/listener every two seconds for new commands submitted for remote execution. This listener component posted to POST: /cec/webclient for later retrieval by the attacker.

Example 1—Topology Inference Attack (Local and Remote)

This attack is a demonstration of Threat 1 (Malicious CEC Scanning) possible through CEC in online and offline scenarios. The HDMI-Walk architecture was used to move through the distribution and gather information about every device available with malicious intent. This attack can be executed through the local or remote client.

Step 1—Activation: Upon initial placement within the HDMI distribution, the listener automatically connects and begins the information gathering process with remote and local execution of HDMI-Walk scans.

Step 2—Information Gathering: The listener begins to perform a "walk" over all of the devices using the CEC scanner module. This easily yields information about HDMI device type, device, logical address, physical address, active source, vendor, CEC version, device name, and power status from available devices in the distribution. Once this has been processed, the listener stores the data locally.

Step 3—Leakage: For a local client, the data is ready to be retrieved through the File I/O module upon local client request. For the remote client, the listener performs a call to POST: /cec/webclient with all the captured information. The data is submitted to the remote server in the form of a JavaScript Object Notation (JSON) object to be retrieved by a remote attacker.

Evaluation: With this attack, the scanning functionality was used to "walk" and gather more information on the controllable devices available. The attack was entirely successful and allowed the attacker to learn information both locally and remotely about each accessible device. As seen in Table 4, information such as the device logical/physical address, active source state, vendor name, CEC Version, OSD Name, and power status was gathered. With this information, an attacker can infer usage from the power state of the equipment. For example, an attacker may be able to infer that a room is in use when the power state of the displays is on or perform more vendor and device-specific attacks with more research on specific devices.

TABLE 4

Attack 1-Information gathered through HDMI-Walk.

| Info | Addr 00 | Addr 01 | Addr 02 | Addr 04 | Addr 05 |
|---|---|---|---|---|---|
| P. Addr | 0.0.0.0 | f.f.f.f | 4.0.0.0 | 3.0.0.0 | 1.0.0.0 |
| Active | No | Yes | No | No | No |
| Vendor | Unk | Unk | Pulse-Eight | Google | Sony |
| OSD Str | TV | RPI | CECTestr | Chromecast | STR-ZA2100 |
| CEC Ver | 1.4 | 1.3a | 1.4 | 1.4 | 1.4 |
| Pow Status | ON | ON | ON | ON | Standby |
| Language | Eng. | Eng. | Eng. | Unk | Unk |

Example 2—CEC-Based Eavesdropping (Local)

This attack was performed to demonstrate Threat 2 (Eavesdropping) and Threat 4 (Information Theft). In this local attack, an attacker has access only to the HDMI port for communication with the listener device. The attacker walks the HDMI distribution and forwards messages to the listener to activate and record audio using the Microphone Access Module. This audio data is stored locally in the listener device. The audio data is then transferred to the client at a later date through the use of the File I/O module.

Step 1—Listener: The attacker first places a listener device in the CEC distribution as noted by the architecture. The listener device awaits attacker commands from another location in the HDMI distribution.

Step 2—Listener Activation: The attacker sends the request to perform an HDMI-walk to scan the devices and identifies the listener device in the CEC distribution. The logical address of the listener device is noted and the Microphone Module is activated with "bb:bb:bb:bb" command received by the listener. The listener device records audio and stores the data locally.

Step 3—Client Request: The client requests a file transfer using the File I/O module and the command "aa:aa:aa:aa" to the listener. The listener receives this command via the CEC distribution and serializes the stored audio data as the client awaits the data transfer. Once the audio file is serialized the File I/O module transmission begins.

Step 4—Client processing: The audio data is transmitted from the listener device to the client service through the File I/O module. Once this is finished the client saves the audio file locally, making it available to the attacker.

Figure 5:
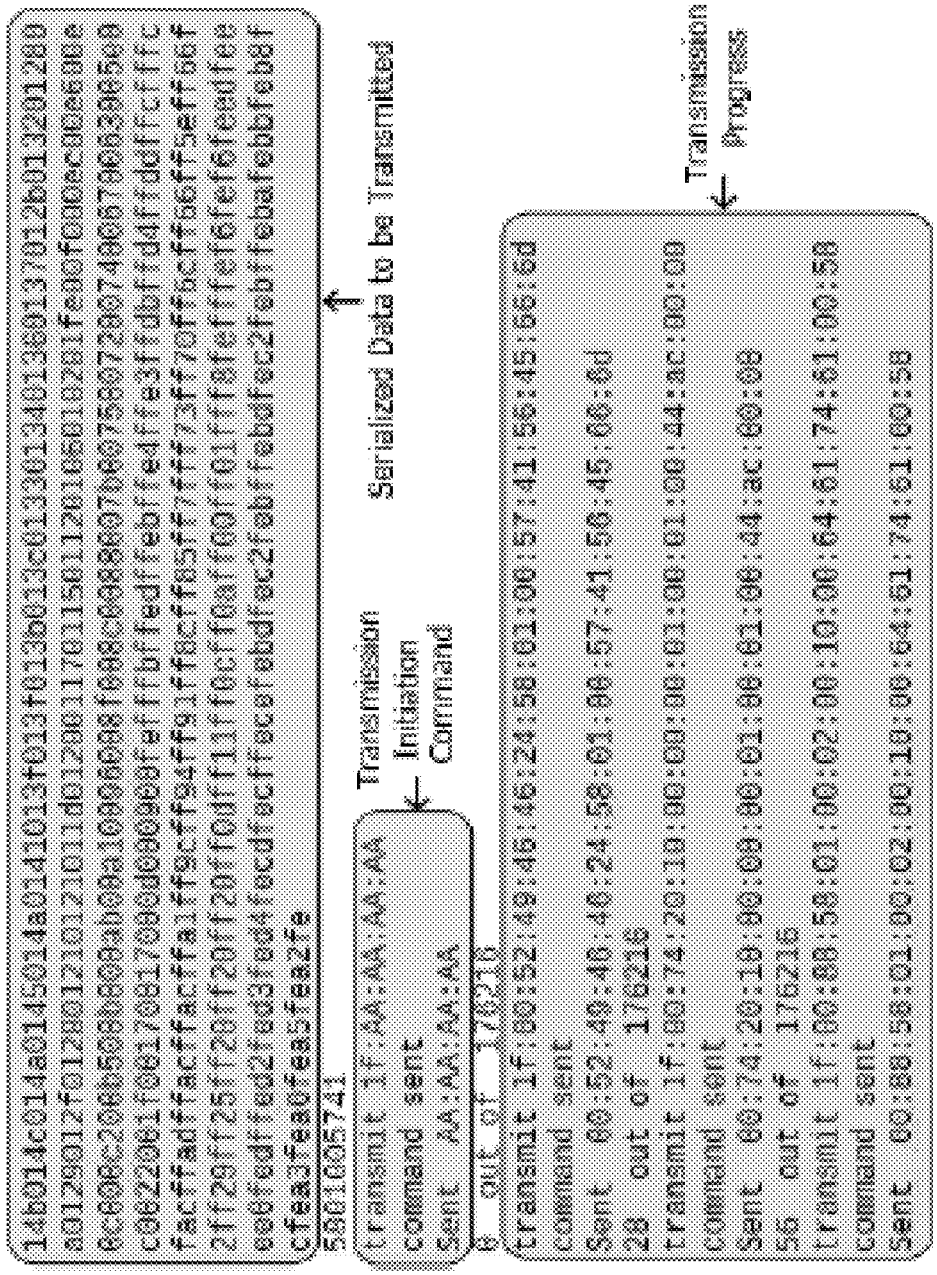
FIG. 5 shows an attack of file input/output (I/O) module transfer of audio data.

Evaluation: For this attack, the attacker had success at every stage of the attack. Tests performed in different locations of the HDMI distribution proved successful. Script activation began and a recording was saved locally. The listener device successfully received the activation command from the client and a recording was successfully stored locally within the listener device. At a later time, the client requested the audio data from the listener device through the assigned message. The listener successfully confirmed the receipt of this message and began the data transfer over the CEC network to the client as seen in FIG. 5. The client successfully stored and deserialized this data into a valid file format. This further opened the possibility to a listener who could await keywords such as "password" passively or use voice-to-text technology to transfer days of conversations to an adversary.

Example 3—WPA/WPA2 Handshake Theft (Local)

This attack was specified in order to demonstrate the concepts of Threat 3 (Facilitation of Attacks) and Threat 4 (Information Theft). In this local attack, the attacker uses HDMI-Walk to facilitate WPA/WPA2 handshake capture and prevent detection by a security system in place. In traditional handshake theft attacks, an attacker has to wait for a handshake to occur, and this can take an indefinite amount of time as the WPA handshake is only transferred in specific cases. If there is a time constraint, the attacker must attempt forced de-authentication. This raises the issue that forced de-authentication may be detected through a network scanner such as Wireshark or through more complex intrusion detection systems (IDSs). In this attack, such a threat was facilitated through the removal of time constraints.

Step 1—Initial Configuration: The attacker must be especially careful about the listener placement. The listener must be able to reach wireless network connections and must also come equipped with a wireless adapter capable of "monitor mode" for packet capture.

Step 2—Client Trigger: The client triggers the listener's service wireless attack module. This activates the wireless adapter in monitor mode with airmon-ng, then begins the capture with airodump-ng using the wlan1 interface and BSSID "7C:8B:CA:49:45:D2" in the listener device. Airodump-ng process is opened in separate terminal using Python's OS import command. This places the listener in a passive state which awaits handshakes to naturally occur without forced de-authentication. The attacker is not needed for the duration of this capture. At a later time, an authorized user connects and the handshake is captured passively.

Step 3—Handshake Retrieval: The attacker reconnects with the client and requests the handshake from listener. The listener first cleans the capture .cap file using wpaclean. This greatly reduces the file size and the transfer begins. The attacker can finally receive the cleaned capture through the CEC File I/O module.

Figure 6:
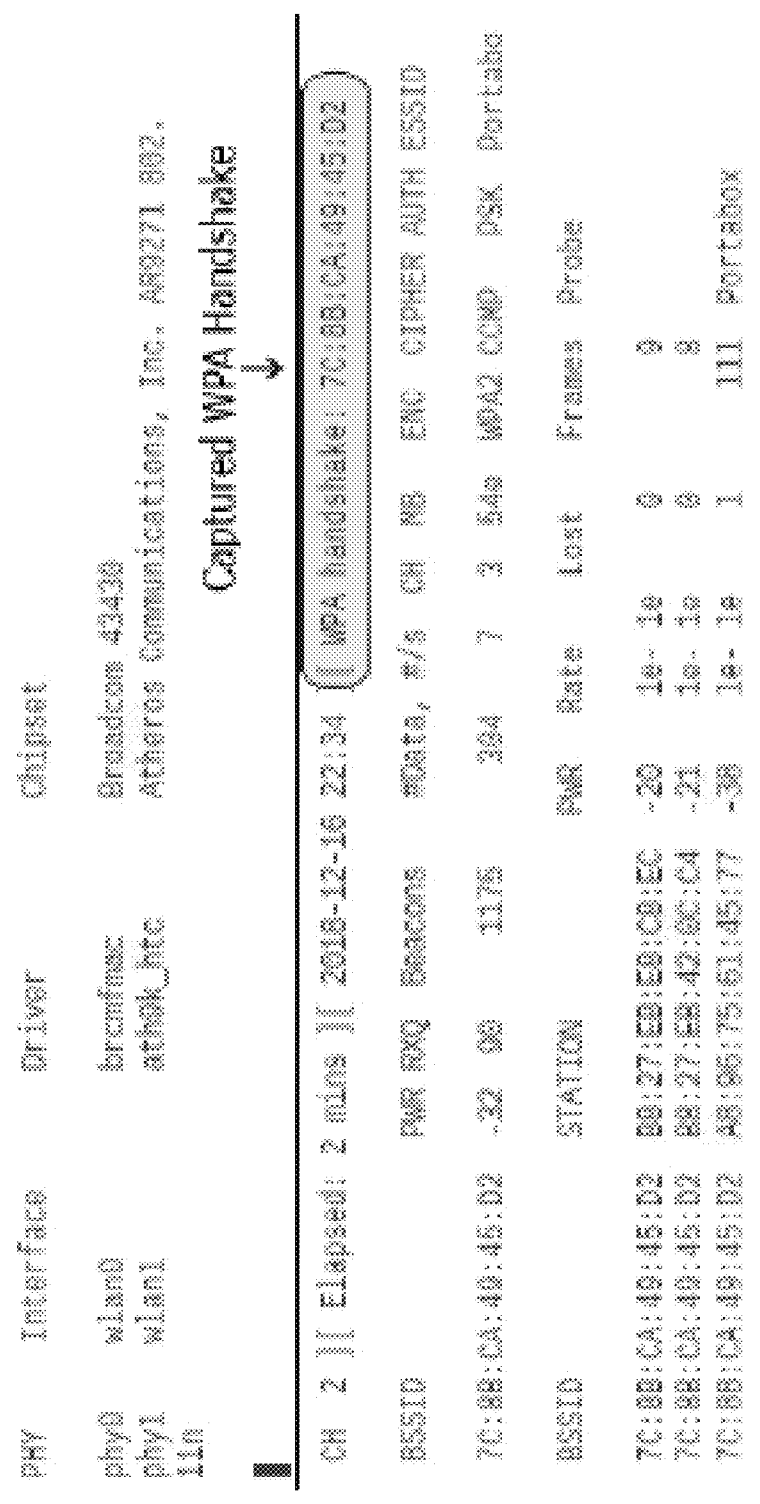

Evaluation: Local CEC client triggers for the activation of this attack proved entirely successful. Activation of the wireless module, Airodump-ng, and cleanup functions succeeded as seen in FIG. 6. With the capture size reduced, the handshake was transferred to the local client successfully. This process would allow the attacker to retrieve the handshake at a later date and use more computing resources to attempt to crack the handshake and gain unauthorized access to the network. This would then allow the attacker to enable remote functionality to their own listener.

Example 4—Targeted Device Attack (Local and Remote)

This attack was developed to demonstrate Threat 5 (Denial of Service) through arbitrary sniffing and control of a device. In this attack, the attacker uses functionality from the Python-based listener service to target a specific device in the HDMI distribution. The attacker also takes advantage of the nature of CEC to sniff and detect when a device has been turned on. This attack can be divided into three main steps.

Step 1—Activation: The listener awaits attack activation. It awaits commands either from the local client (through a walk) or from a remote client to activate the targeted attack. Once a command is received, the listener activates the attack.

Step 2—Sniffing: The listener is set within an HDMI distribution and monitors CEC packets flowing through the distribution. The attacker particularly listens to the data commands "84:00:00:00", "87:1f:00:08" and "80:00:00:30: 00" from any incoming source. These values usually signify a device broadcasting to HDMI distribution devices that its power state has changed and has been turned on. More specifically, 84 reports physical address, 87 reports vendor ID, and 80 reports a routing change. In this particular attack, the attacker targeted a CEC enabled display, the Sharp television.

Step 3—DoS attack: Once the attack is active the listener awaits commands associated with power state change within the HDMI distribution. Once the power state change is detected it sends the CEC shutoff command "20:36" to the display (ID: 0) in the distribution. This automatically powers off the display as soon as it is powered on.

Evaluation: The listener began in an inactive state as expected with passive listening of the CEC commands. Powering the display did not cause any changes in this inactive state. The listener successfully received the activation command over remote and local clients, activating the attack mode. With this mode active, the display was manually powered on. The module in the service successfully identified the power state change in the display and provided the shutoff command as seen in FIG. 7. The display received the shutoff commands and immediately powered off as expected. No matter which method of powering on, the attack could not be avoided, successfully executing the DoS attack. There was another notable finding while performing this attack. That is, during DoS, the user was prevented from disabling CEC control within the system. Additionally, this attack may prove difficult to detect as it may be mistaken for a malfunctioning display.

Example 5—Display Broadcast DoS (Local and Remote)

This attack was developed to demonstrate Threat 5 (Denial of Service) through broadcast functionality. This attack abuses the broadcast function in CEC to cause a DoS condition in any display within a given HDMI distribution. This attack specifically targets displays by producing standard CEC commands for source and input control. This attack can be divided into three steps.

Step 1—Insertion of Attacker Listener: The listener device is placed in any location of the HDMI distribution. The device then awaits instructions from a client service to begin the attack. In the case of an available wireless connection, the listener's Remote Access Module becomes active.

Step 2—Activation Phase: The listener activates in two different methods: (1) the listener receives a direct command from a client service to begin the attack; and (2) the listener receives through a remote client with the DOS1 command.

Step 3—DoS attack phase: After activation conditions are reached, the listener device begins broadcast of various display input change commands. These are standard CEC commands accepted by enabled televisions to adjust the active source on the display device. The CEC distribution is flooded with a broadcast loop: power on ("20:04"), input 1 ("82:10:00"), input 2 ("82:20:00"), input 3 ("82:30:00"), and input 4 ("82:40:00"). This renders the displays unusable by the user, effectively creating a DoS attack.

Figure 8:
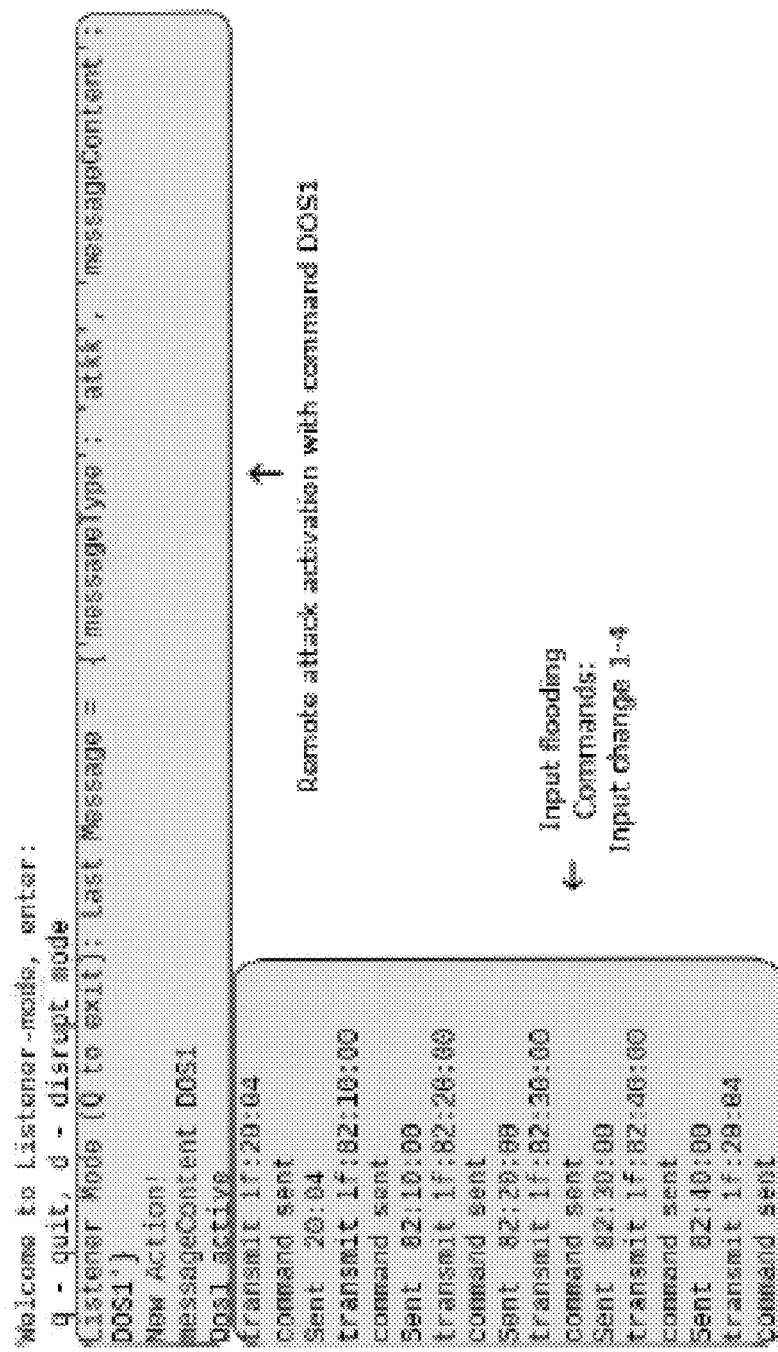
FIG. 8 shows an attack of input-change induced denial of service (DoS) attack, executed by a remote attacker with command "DOS1".

Evaluation: In this attack, the listener began in an idle state as intended in the distribution. The listener successfully received the activation command over remote and local clients. Then, it initiated the DoS broadcast loop over the entire distribution as depicted in FIG. 8. The attack first powered on the display if it was powered off. The loop then began rapid input change over all inputs on the display. The display began to flash rendering it unusable. Faster switching between inputs occurred than if compared with manual input change. Another effect of this condition is that it made it impossible for the user to alter any settings in the display to disable external control after activation.

During the testing of HDMI-Walk attacks in Examples 1-5, it was seen that HDMI-Walk can identify specific device information to develop further attacks. Arbitrary control can be exerted over HDMI devices, which could be used to an attacker's advantage. Also, we control of the TV volume and amplifier volume with devices in the testbed was demonstrated. This control is completely feasible in an HDMI distribution with the concepts of HDMI-Walk. These attacks are critical as they occur over a medium without any form of security mechanisms or existing techniques for mitigation. In Example 4, it was found that the input change control could become a viable form of a visual attack. With these functions, display input changes could be used to trigger seizures (e.g., television-induced epileptic attack) with the rapid flickering of a display switching between inputs. Volume control to an amplifier device was also considered. A remote attacker with the control of a distribution can easily adjust the volume of devices with CEC commands. Extended playback at high volumes is known to damage sound equipment. An implementation of Example 1 would first allow an attacker to infer room occupancy via power state. Combining this with the attack of Example 4, the attacker could peak the volume output in a room when nobody is present and cause gradual damage to the sound system, which could cause a notable financial cost to the user. A combination of HDMI-Walk and targeted device attacks such as that in Example 4 could also allow a malicious person to assume control of menu functions in specific HDMI devices. This would allow the attacker to change menu settings, make purchases, or update firmware through device-tailored command sequences. With attackers in constant search for new vectors of attack, disruption, data leakage, behavioral leakage, and any type of information leakage could present catastrophic outcomes to an organization. A conference room while in confidential use can be a target to eavesdropping and handshake theft, giving attackers a chance to acquire passwords, access codes, and confidential information. In normal usage, inferring device states and disrupting functionality is possible and can present a threat that many users have not considered or anticipated.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for monitoring activity within a High Definition Multimedia Interface (HDMI) consumer electronics control (CEC) network, the system comprising:
    a processor; and
    a machine-readable medium in operable communication with the processor and the HDMI CEC network and having instructions stored thereon that, when executed by the processor, perform the following steps:
        collecting, from first devices of the HDMI CEC network, first data comprising first features about the first devices;
        analyzing the first data using a machine learning model to compare the first features to second features known to be from benign devices; and
        determining whether any malicious activity is occurring within the HDMI CEC network based on the analyzing of the first data, to produce a decision on whether any malicious activity is occurring within the HDMI CEC network; and
        providing, to a display in operable communication with the machine-readable medium, the decision on whether any malicious activity is occurring within the HDMI CEC network,
    the instructions when executed further performing the following steps prior to the collecting of the first data:
        collecting, from second devices of a known benign HDMI CEC network, second data comprising second features about the second devices; and
        processing the second data using machine learning based on the second features to create the machine learning model.

2. The system according to claim 1, the first features comprising CEC command type, and the second features comprising CEC command type.

3. The system according to claim 1, the first data comprising packet attribute data of the first devices,
    the first data features comprising packet length, packet source, and packet destination, and
    the second data features comprising packet length, packet source, and packet destination.

4. The system according to claim 1, the machine learning model being a Markov Chain model.

5. The system according to claim 1, the collecting of the first data comprising passively collecting the first data without any user participation required, and
    the collecting of the second data comprising passively collecting the second data without any user participation required.

6. The system according to claim 1, the first features comprising CEC command type, and the second features comprising CEC command type.

7. The system according to claim 1, the second data comprising packet attribute data of the second devices, and
    the second data features comprising packet length, packet source, and packet destination.

8. The system according to claim 1, the machine learning model being a Markov Chain model.

9. A method for monitoring activity within a High Definition Multimedia Interface (HDMI) consumer electronics control (CEC) network, the method comprising:
    collecting, by a processor in operable communication with the HDMI CEC network, first data from first devices of the HDMI CEC network, the first data comprising first features about the first devices;
    analyzing, by the processor, the first data using a machine learning model to compare the first features to second features known to be from benign devices; and
    determining, by the processor, whether any malicious activity is occurring within the HDMI CEC network based on the analyzing of the first data, to produce a decision on whether any malicious activity is occurring within the HDMI CEC network; and
    providing, to a display in operable communication with the processor, the decision on whether any malicious activity is occurring within the HDMI CEC network,
    the method further comprising, prior to the collecting of the first data;
        collecting, from second devices of a known benign HDMI CEC network, second data comprising second features about the second devices; and
        processing the second data using machine learning based on the second features to create the machine learning model.

10. The method according to claim 9, the first features comprising CEC command type, and the second features comprising CEC command type.

11. The method according to claim 9, the first data comprising packet attribute data of the first devices,
    the first data features comprising packet length, packet source, and packet destination, and
    the second data features comprising packet length, packet source, and packet destination.

12. The method according to claim 1, the machine learning model being a Markov Chain model.

13. The method according to claim 9, the collecting of the first data comprising passively collecting the first data without any user participation required, and
    the collecting of the second data comprising passively collecting the second data, without any user participation required.

14. The method according to claim 9, the first features comprising CEC command type, and the second features comprising CEC command type.

15. The method according to claim 9, the second data comprising packet attribute data of the second devices, and
    the second data features comprising packet length, packet source, and packet destination.

16. A system for monitoring activity within a High Definition Multimedia Interface (HDMI) consumer electronics control (CEC) network, the system comprising:

a processor; and a machine-readable medium in operable communication with the processor and the HDMI CEC network and having instructions stored thereon that, when executed by the processor, perform the following steps:

collecting, from first devices of the HDMI CEC network, first data comprising first features about the first devices;

analyzing the first data using a machine learning model to compare the first features to second features known to be from benign devices;

determining whether any malicious activity is occurring within the HDMI CEC network based on the analyzing of the first data, to produce a decision on whether any malicious activity is occurring within the HDMI CEC network; and providing, to a display in operable communication with the machine-readable medium, the decision on whether any malicious activity is occurring within the HDMI CEC network, the instructions when executed further performing the following steps prior to the collecting of the first data:

collecting, from second devices of a known benign HDMI CEC network, second data comprising second features about the second devices; and processing the second data using machine learning based on the second features to create a machine learning model, the machine learning model being a Markov Chain model the collecting of the first data comprising passively collecting the first data without any user participation required, the collecting of the second data comprising passively collecting the second data without any user participation required, and either:

a) the first features comprising CEC command type and the second features comprising CEC command type; or b) the first data comprising packet attribute data of the first devices, the first data features comprising packet length, packet source, and packet destination, the second data comprising packet attribute data of the second devices, and the second data features comprising packet length, packet source, and packet destination.

* * * * *